United States Patent
Chen et al.

(10) Patent No.: US 11,965,965 B2
(45) Date of Patent: Apr. 23, 2024

(54) LOCALIZATION INITIALIZATION FOR AUTONOMOUS VEHICLES

(71) Applicant: Waymo LLC, Mountain View, CA (US)

(72) Inventors: Mingcheng Chen, Sunnyvale, CA (US); Colin Braley, Mountain View, CA (US); Craig Lewin Robinson, Palo Alto, CA (US); Christian Lauterbach, Campbell, CA (US)

(73) Assignee: Waymo LLC, Mountain View, CA (US)

( * ) Notice: Subject to any disclaimer, the term of this patent is extended or adjusted under 35 U.S.C. 154(b) by 54 days.

(21) Appl. No.: 17/388,199

(22) Filed: Jul. 29, 2021

(65) Prior Publication Data

US 2021/0356596 A1 Nov. 18, 2021

Related U.S. Application Data

(63) Continuation of application No. 16/204,534, filed on Nov. 29, 2018, now Pat. No. 11,105,927.

(51) Int. Cl.
*G01S 17/89* (2020.01)
*G05D 1/00* (2006.01)

(52) U.S. Cl.
CPC ............ *G01S 17/89* (2013.01); *G05D 1/0088* (2013.01)

(58) Field of Classification Search
None
See application file for complete search history.

(56) References Cited

U.S. PATENT DOCUMENTS

| | | | |
|---|---|---|---|
| 6,577,952 B2 * | 6/2003 | Geier | G01S 19/49 701/472 |
| 8,655,588 B2 | 2/2014 | Wong et al. | |
| 9,002,098 B1 * | 4/2015 | Chelian | G06V 10/422 382/153 |
| 9,043,069 B1 * | 5/2015 | Ferguson | G06T 7/215 701/23 |

(Continued)

FOREIGN PATENT DOCUMENTS

| | | | |
|---|---|---|---|
| JP | 2012221458 A | | 11/2012 |
| JP | 2018128954 A | * | 8/2018 |
| JP | 2018128954 A | | 8/2018 |

OTHER PUBLICATIONS

Machine translation of JP2018128954, via espace.net (2022).*

(Continued)

*Primary Examiner* — Adam D Tissot
(74) *Attorney, Agent, or Firm* — Botos Churchill IP Law

(57) ABSTRACT

The technology relates to localizing a vehicle. As one approach, a first LIDAR sensor scan data of an environment of the vehicle and localization data for the vehicle at a location where the first LIDAR sensor scan was captured are stored. Thereafter, the computing device is suspended and subsequently unsuspended. After the computing device is unsuspended, second LIDAR sensor scan data of the vehicle's environment is received. The first LIDAR sensor scan data is compared to the second LIDAR sensor scan data to determine whether the vehicle has moved. Based on the determination of whether the vehicle has moved from the location, the stored localization data is used to localize the vehicle. Other approaches are also described.

18 Claims, 14 Drawing Sheets

(56) References Cited

U.S. PATENT DOCUMENTS

| | | | |
|---|---|---|---|
| 9,580,285 B2 | 2/2017 | Wong et al. | |
| 2005/0057561 A1* | 3/2005 | El-Din | G06T 17/20 |
| | | | 345/419 |
| 2011/0243379 A1 | 10/2011 | Miyajima et al. | |
| 2015/0331422 A1 | 11/2015 | Hartung et al. | |
| 2017/0030722 A1 | 2/2017 | Kojo | |
| 2017/0371344 A1* | 12/2017 | Cohen | G06T 7/593 |
| 2017/0371348 A1* | 12/2017 | Mou | G01S 17/86 |
| 2018/0005050 A1 | 1/2018 | Browning et al. | |
| 2018/0079085 A1 | 3/2018 | Nakata et al. | |
| 2018/0154901 A1* | 6/2018 | Hasberg | B60W 40/04 |
| 2018/0204347 A1 | 7/2018 | Stenborg | |

OTHER PUBLICATIONS

The Extended European Search Report for European Patent Application No. 19890954.1, dated May 24, 2022.

International Search Report and Written Opinion for Application No. PCT/US2019/061952 dated Mar. 13, 2020.

Notice of Allowance for Chinese Patent Application No. 201980077545. 3, dated Nov. 29, 2023, 7 Pages.

\* cited by examiner

LOCALIZATION INITIALIZATION FOR AUTONOMOUS VEHICLES

CROSS REFERENCE TO RELATED APPLICATIONS

The present application is a continuation of U.S. patent application Ser. No. 16/204,534, filed Nov. 29, 2018, the entire disclosure of which is incorporated herein by reference.

BACKGROUND

Autonomous vehicles, such as vehicles that do not require a human driver, can be used to aid in the transport of passengers or items from one location to another. Such vehicles may operate in a fully autonomous driving mode where passengers may provide some initial input, such as a destination, and the vehicle maneuvers itself to that destination. Thus, such vehicles may be largely dependent on systems that are capable of determining the location of the autonomous vehicle at any given time, as well as detecting and identifying objects external to the vehicle, such as other vehicles, stop lights, pedestrians, etc.

Because of this, each time the vehicle's computing devices are turned on, the location and orientation of the vehicle relative to its map and the world and the biases (offsets) of the accelerometers and gyroscopes must be determined. This can be a critically important operation, and typically may require miles of manual driving, capturing sensor data, and comparing to map information to obtain accurate localization and biases. While this may be a useful approach for a single vehicle, when such efforts are factored across a plurality of autonomous vehicles in a fleet of vehicles, localization can become difficult, time consuming, and costly.

BRIEF SUMMARY

Aspects of the disclosure provide of localizing a vehicle. The method includes storing a first LIDAR sensor scan data of an environment of a vehicle and localization data for the vehicle at a location where the first LIDAR sensor scan was captured; after storing the first LIDAR sensor scan data, suspending the computing device of the vehicle; unsuspending the computing device of the vehicle; after the computing device of the vehicle is unsuspended, receiving second LIDAR sensor scan data of the vehicle's environment; comparing the first LIDAR sensor scan data to the second LIDAR sensor scan data to determine whether the vehicle has moved; and based on the determination of whether the vehicle has moved from the location, using the stored localization data to localize the vehicle.

In one example, the method also includes using a LIDAR sensor to capture the first LIDAR sensor scan data and to capture the second LIDAR sensor scan data. In this example, the method also includes, prior to comparing: filtering the first LIDAR sensor scan data to remove data points beyond a threshold distance from the LIDAR sensor when the first LIDAR sensor scan data was captured, filtering the second LIDAR sensor scan data to remove data points beyond a threshold distance from the LIDAR sensor when the second LIDAR sensor scan data was captured, and comparing includes comparing the filtered first LIDAR sensor scan data with the filtered second LIDAR sensor scan data. In addition or alternatively, using the LIDAR sensor to capture the first LIDAR sensor scan data and to capture the second LIDAR sensor scan data includes operating the LIDAR sensor according to required performance specifications. In another example, comparing includes using an ICP algorithm to determine rotation and translation between points of the first LIDAR sensor scan data and points of the second LIDAR sensor scan data. In another example, the method also includes determining a percentage of pairs of points between the first LIDAR sensor scan data and the second LIDAR sensor scan data having rotations and translations within tolerance values, and using the stored localization data is further based on the percentage of pairs of points. In another example, the localization data includes a location of the vehicle and an orientation of the vehicle. In another example, the localization data further includes biases for one or more of an accelerometer of the vehicle or a gyroscope of the vehicle. In another example, the method also includes, prior to suspending the computing device, measuring a first temperature of the environment of the vehicle; after the computing device is unsuspended, measuring a second temperature of the environment of the vehicle; and comparing the first temperature to the second temperature, and wherein using the stored localization data to localize the vehicle is further based on the comparing of the first temperature to the second temperature. In another example, the computing device is a computing device configured to control the vehicle in an autonomous driving mode.

Another aspect of the disclosure provides a method of localizing a vehicle. The method includes unsuspended a computing device of the vehicle; after the computing device of the vehicle is unsuspended, receiving first LIDAR sensor scan data and localization information for a location where the first LIDAR sensor scan was captured; after the computing device of the vehicle is unsuspended, receiving second LIDAR sensor scan data of the vehicle's environment; comparing the first LIDAR sensor scan data to the second LIDAR sensor scan data to determine a transform; and applying the transform to the localization information to localize the vehicle.

In one example, the method also includes using a LIDAR sensor to capture the second LIDAR sensor scan data. In this example, the method also includes, prior to comparing, filtering the first LIDAR sensor scan data to remove data points beyond a predetermined distance from the LIDAR sensor when the first LIDAR sensor scan data was captured, filtering the second LIDAR sensor scan data to remove data points beyond a predetermined distance from the LIDAR sensor when the second LIDAR sensor scan data was captured, and the comparing includes comparing the filtered first LIDAR sensor scan data with the filtered second LIDAR sensor scan data. In one example, the comparing includes using an ICP algorithm to determine rotation and translation between points of the first LIDAR sensor scan data and points of the second LIDAR sensor scan data. In another example, the localization information includes a location of a LIDAR sensor that captured the first LIDAR sensor scan data and pitch, yaw, and roll of the LIDAR sensor. In another example, the applying the transform further includes using the transformed localization data to determine biases for one or more of an accelerometer of the vehicle or a gyroscope of the vehicle. In another example, the computing device is a computing device configured to control the vehicle in an autonomous driving mode. In another example, the first LIDAR sensor scan data is received from a remote computing device. In this example, the first LIDAR sensor scan data is received from the remote computing device as a broadcast message from the remote computing devices. Alternatively, the first LIDAR scan data is received from the remote computing device in response to a request for localization information from the computing device.

DETAILED DESCRIPTION

Figure 1:
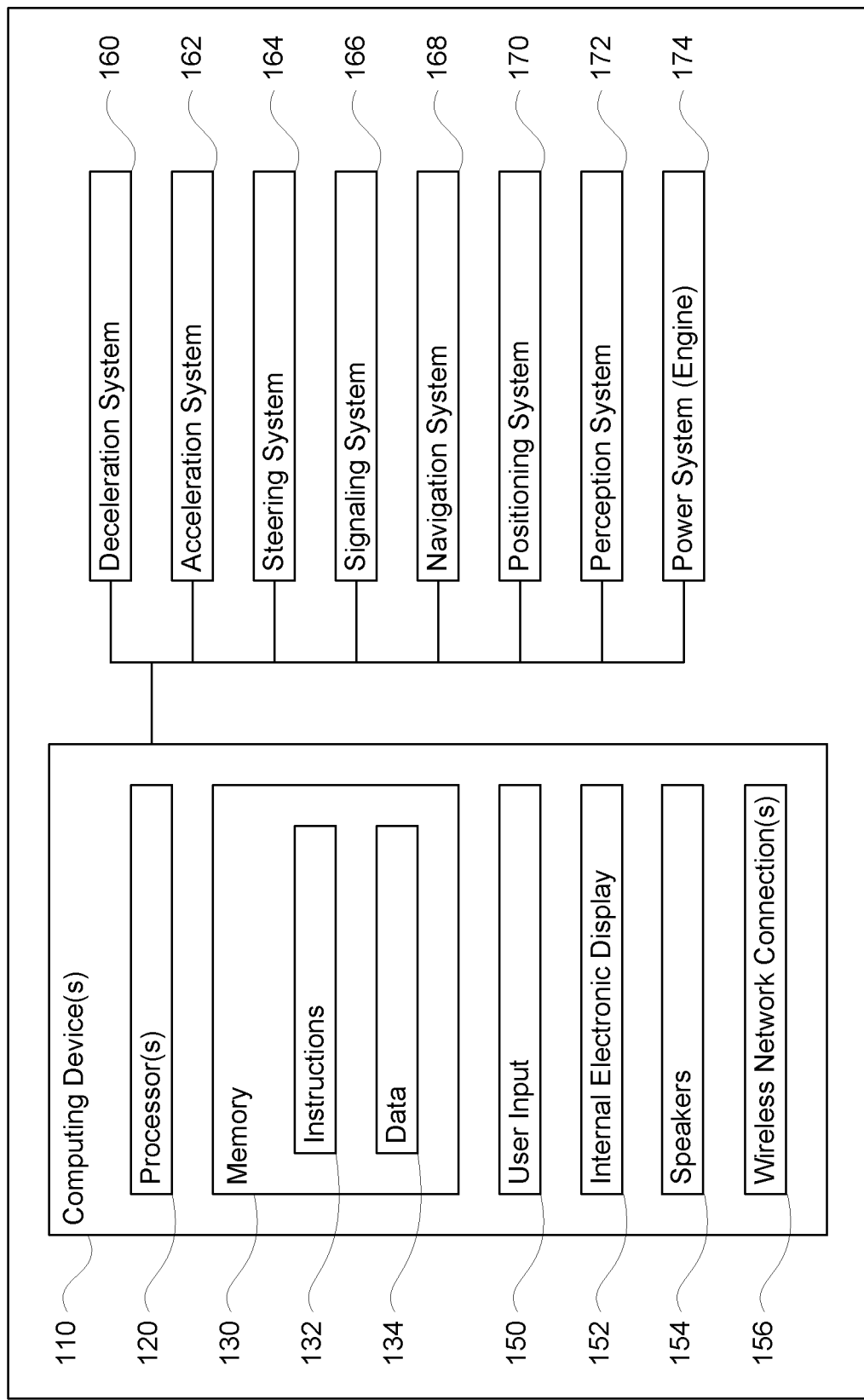
FIG. 1 is a functional diagram of an example vehicle in accordance with aspects of the disclosure according to aspects of the disclosure.

The technology relates to localizing an autonomous vehicle when the vehicle has been off or rather, the vehicle's computing devices have been suspended or powered down, shut down, turned off, put into a low power mode or otherwise deactivated and no longer attempting to localize the vehicle. As noted above, each time the vehicle's computing devices are unsuspended or powered up, turned on, or otherwise activated and attempting to localize the vehicle the location and orientation of the vehicle relative to its map and the world and the biases (offsets) of the accelerometers and gyroscopes must be determined. This can be a critically important operation, and typically may require miles of manual driving, capturing sensor data, and comparing to map information to obtain accurate localization and biases. While this may be a useful approach for a single vehicle, when such efforts are factored across a plurality of autonomous vehicles in a fleet of vehicles, localization can become difficult, time consuming, and costly. Another approach can be to have a human operator input into the vehicle's computing devices information indicating that the vehicle has not moved since the vehicle's computing devices were last suspended. The vehicle may then be driven manually in order to set the biases. This approach may be prone to errors since a human operator may incorrectly indicate that the vehicle has not moved, for instance, because the vehicle was bumped, etc.

As another approach, the vehicle may be configured to "remember" its last known localization data (position, orientation, and biases) when the vehicle's computing devices were suspended. For instance, this information may be read and saved to persistent memory that retains the information when the vehicle's computing devices are unsuspended. The information may then be loaded from the memory and used to control the vehicle autonomously. However, this approach can fail when the vehicle's computing devices are unable to accurately determine whether the vehicle has been moved, for instance, by being pushed or bumped or otherwise transported.

As a more nuanced approach, rather than only saving the vehicle's last known location, the vehicle's computing devices may save the vehicle's last complete LIDAR sensor scan. In some instances, ensure that the LIDAR sensor data is "useful" and not distorted or otherwise corrupted, the LIDAR sensor data that is saved may be that of the last complete scan of the LIDAR sensor when the LIDAR sensor is operating according to required performance specifications. This reduces the likelihood of errors if the actual last scan is not fully completed and/or the LIDAR sensor data is not properly processed before storing. Of course, so long as the vehicle is parked, any scan (and not simply the last complete scan) may be saved.

Once the vehicle is unsuspended, a new LIDAR sensor scan may be captured. To ensure consistency, this LIDAR sensor scan may be captured before the vehicle is moved and when the LIDAR sensor is operating according to required performance specifications, such as a specified rotation speed, etc. This new LIDAR sensor scan may be compared to the saved LIDAR sensor scan to determine whether the vehicle has not moved since it was turned off (and the computing devices were suspended). If the vehicle is determined not to have moved, the saved localization data may be automatically set as the vehicle's current localization data. In order to avoid false positives, some portion of the LIDAR sensor data may be discarded before or while comparing.

However, this approach may be less useful in more dynamic environments, such as in a parking lot where other vehicles nearby are parked and un-parked fairly often. To address these situations, a completely different approach may be taken. For instance, a remote device including at least a computing device, a positioning system, a LIDAR sensor and a transmitter may capture a LIDAR sensor scan of the localization device's environment and send this LIDAR sensor scan as well as localization information such as latitude, longitude, elevation, pitch, yaw and roll for the LIDAR sensor. The vehicle's computing devices may use the LIDAR sensor scan to determine a transform between the vehicle's LIDAR sensor and the LIDAR sensor of the localization device using the ICP algorithm and the comparing and/or filtering features described above. The vehicle's computing devices may then apply the transform to the localization data in order to determine new localization data for the vehicle. For instance, the transformed location and orientation may be used to determine the location and orientation of the vehicle. The transformed pitch, yaw and roll may be used to determine the biases of the vehicle's accelerometers and gyroscopes. At this point, the vehicle itself may become a localization device to assist in the localization of other vehicles as described above.

The localization device may be any number of different types of devices. For instance, the localization device may be another autonomous vehicle, a stationary device, and/or a drone. In addition, the remote computing device may be configured to automatically broadcast the aforementioned LIDAR sensor scan and localization information, or send this information only when prompted by the autonomous vehicle's computing devices.

The features described herein provide efficient and accurate ways to localize a vehicle after its computing devices have been suspended. This can be incredibly useful to reducing costs and other resources (such as human operator time and labor to drive the vehicle in a manual driving mode) when operating a fleet of autonomous vehicles. In other words, these approaches may reduce the time spent localizing vehicles, thereby increasing the time that such vehicles are available for use, for instance, to provide transportation services.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be an autonomous driving computing system incorporated into vehicle 100. The autonomous driving computing system may capable of communicating with various components of the vehicle in order to maneuver vehicle 100 in a fully autonomous driving mode and/or semi-autonomous driving mode. For example, returning to FIG. 1, computing devices 110 may be in communication with various systems of vehicle 100, such as deceleration system 160, acceleration system 162, steering system 164, signaling system 166, navigation system 168, positioning system 170, perception system 172, and power system 174 (for instance, a gasoline or diesel powered motor or electric engine) in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways. In addition, this map information may include information regarding traffic controls, such as traffic signal lights, stop signs, yield signs, etc., which, in conjunction with real time information received from the perception system 172, can be used by the computing devices 110 to determine which directions of traffic have the right of way at a given location.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, microphones, radar units, cameras and/or any other detection devices that record data which may be processed by computing devices 110. The sensors of the perception system may detect objects and their characteristics such as location, orientation, size, shape, type, direction and speed of movement, etc. The raw data from the sensors and/or the aforementioned characteristics can be quantified or arranged into a descriptive function or vector and sent for further processing to the computing devices 110. As an example, computing devices 110 may use the positioning system 170 to determine the vehicle's location and perception system 172 to detect and respond to objects when needed to reach the location safely.

Figure 2:
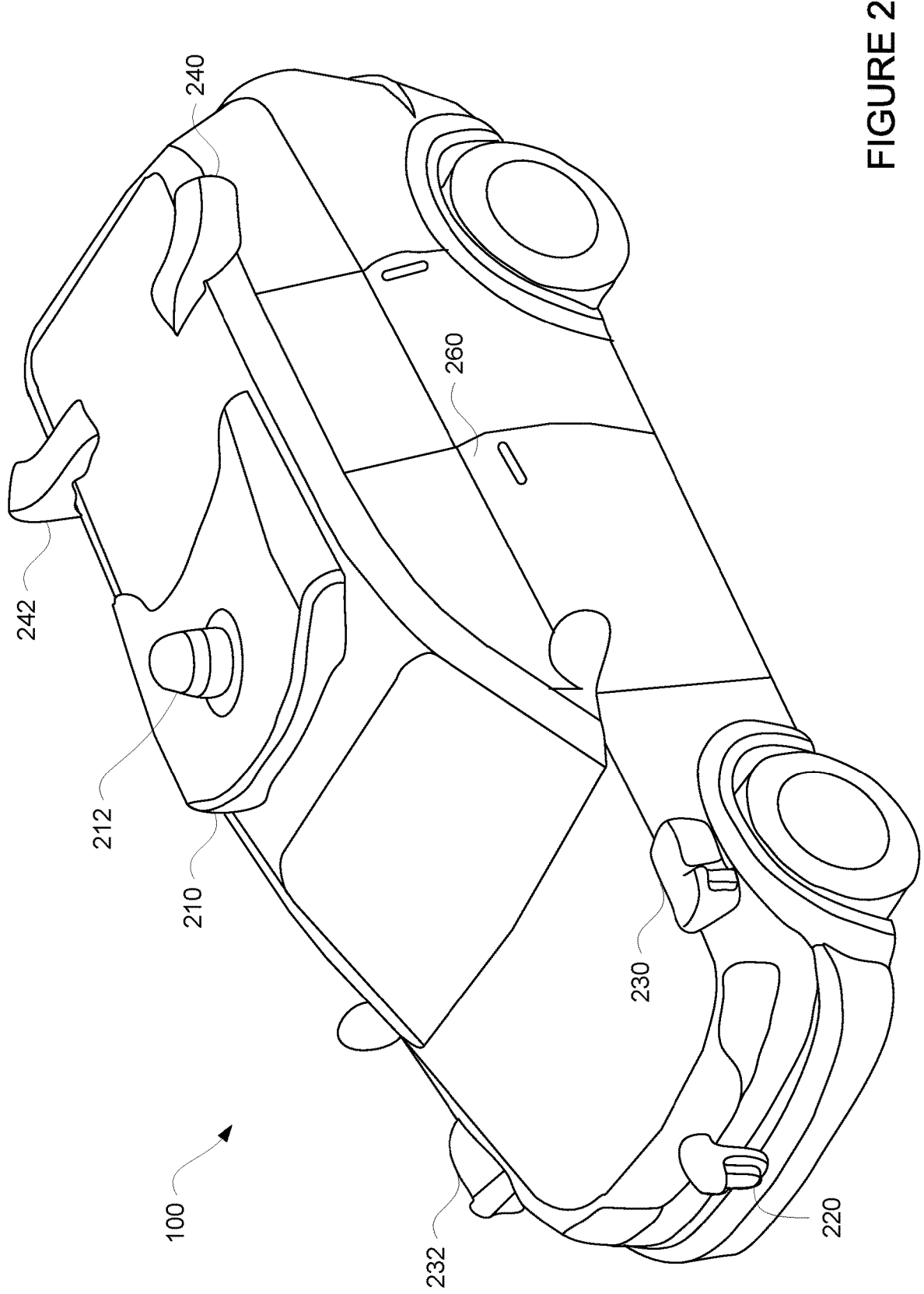
FIG. 2 is an example external view of the example vehicle of FIG. 1 in accordance with aspects of the disclosure.

FIG. 2 is an example external view of vehicle 100 including aspects of the perception system 172. For instance, roof-top housing 210 and dome housing 212 may include a LIDAR sensor or system as well as various cameras and radar units. In addition, housing 220 located at the front end of vehicle 100 and housings 230, 232 on the driver's and passenger's sides of the vehicle may each store a LIDAR sensor or system. For example, housing 230 is located in front of driver door 260. Vehicle 100 also includes housings 240, 242 for radar units and/or cameras also located on the roof of vehicle 100. Additional radar units and cameras (not shown) may be located at the front and rear ends of vehicle 100 and/or on other positions along the roof or roof-top housing 210.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As noted above, from time to time, the computing devices 110 may be suspended and subsequently unsuspended for various reasons. For instance, when the vehicle is not needed for transportation services or can otherwise be powered down (such as to reserve electricity or fuel), an operator vehicle may use a wireless signal (i.e. a remote start system), a physical key, and/or button input for an ignition of the vehicle to turn the vehicle on and off. This, in turn, may cause the computing devices 110 to become suspended or unsuspended.

Figure 3:
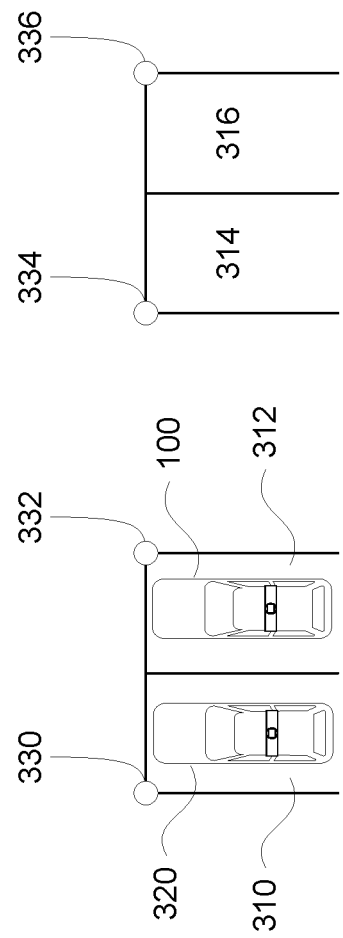
FIG. 3 is an example top-down view of a vehicle and features in the vehicle's environment in accordance with aspects of the disclosure.

For instance, FIG. 3 is an example top-down view of vehicle 100 immediately before the vehicle is turned off and computing devices 110 are suspended. In this example, vehicle 100 is parked in a parking space 312 next to another vehicle 320, and there are a plurality of other objects, including posts 330-336 and parking spaces 314, 316 in the vehicle's environment.

Figure 4:
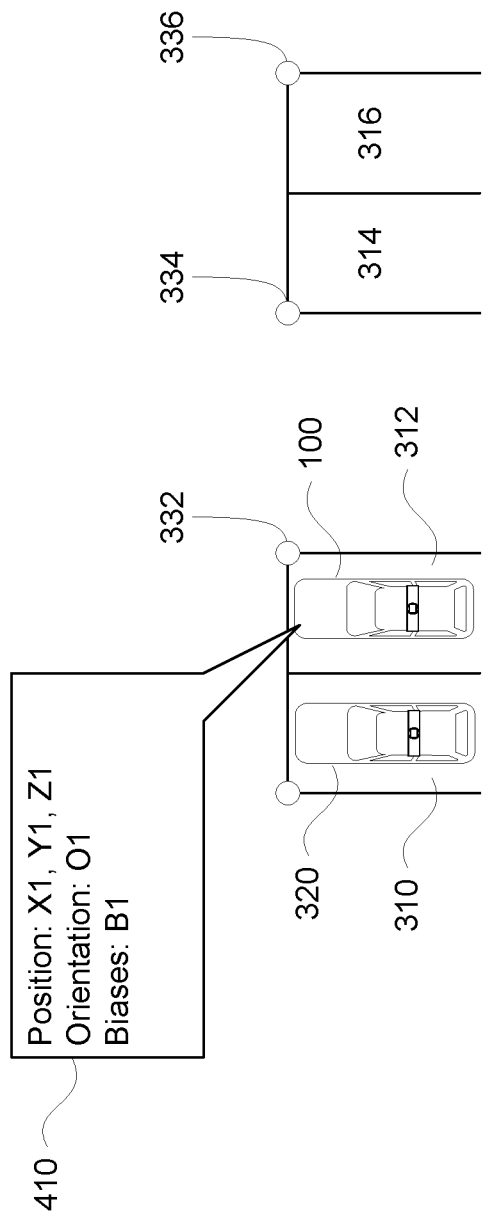
FIG. 4 is an example top-down view of a vehicle, features in the vehicle's environment, and data in accordance with aspects of the disclosure.

As one approach, immediately before the computing devices 110 are suspended, the computing devices may store the vehicle's last known localization data. For instance, in response to the user input at the ignition to turn the vehicle off, the computing devices may automatically retrieve and store localization data for the vehicle. This localization data may include the vehicle's current position (for instance geographic location coordinates such as latitude and longitude coordinates), orientation (which direction is a front end of the vehicle facing), and biases of the accelerometers and/or gyroscopes. In this regard, turning to FIG. 4, the computing devices 110 may access the current position (X1,Y1,Z1), orientation (O1), and biases (B1) and store these as localization data 410 in persistent memory. All or some of this localization may come from the positioning system 170. As an example, the localization data may be read from a temporary portion of the memory 130 or positioning system 170, such as RAM, and saved to persistent memory, such a hard drive of memory 130. This may allow the computing devices 110 to retain the localization data when the vehicle's computing devices are suspended.

The next time the computing devices 110 are unsuspended, for instance, in response to user input or other signal received at the ignition, the stored localization data may then be loaded from the memory 130. For instance, the localization data may be stored in RAM of memory 130 and/or sent to the positioning system 170 for use. In this regard, the stored localization data may be used to localize the vehicle. This may include automatically setting the localization data as the vehicle's current localization data and using this to control the vehicle autonomously. In this regard, the positioning system 170 may report the position, orientation, and biases to other systems of the vehicle as needed to control the vehicle autonomously. However, this approach can fail when the vehicle's computing devices are unable to accurately determine whether the vehicle has been moved, for instance, by being pushed or bumped or otherwise transported while the computing devices 110 are off.

Figure 5:
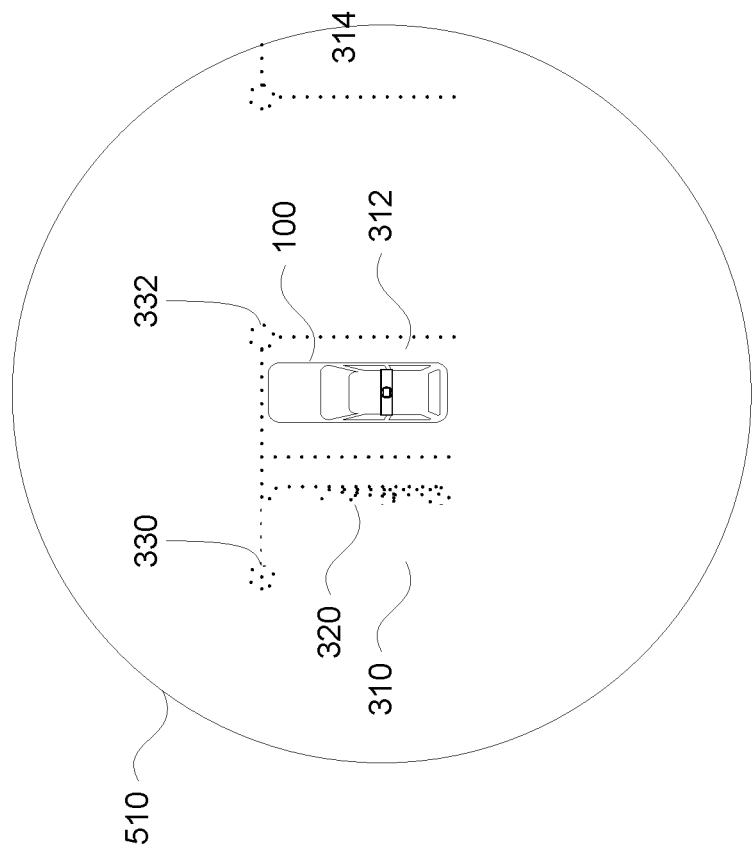
FIG. 5 is an example top-down view of a vehicle and example LIDAR sensor data in accordance with aspects of the disclosure.

To address this, rather than only saving the vehicle's location information, the computing devices 110 may save a LIDAR sensor scan. For instance, if the vehicle has a LIDAR sensor that is able to scan a 360 degree environment, such as the LIDAR sensor of dome housing 212, the last complete scan captured before the computing devices 110 are suspended may be stored in the aforementioned persistent memory of memory 130. In this regard, once user input or other signal has been received at the ignition to turn the vehicle off, immediately before the computing devices 110 are suspended, the computing devices may store the vehicle's last complete LIDAR sensor scan. As an example, this information may be automatically sent by the perception system 172 to the computing devices 110 each time a LIDAR sensor scan is captured. In addition, the LIDAR sensor scan data of the LIDAR sensor scan may include raw sensor data generated by the LIDAR sensor. For example, turning to FIG. 5, area 510 represents a LIDAR sensor scan and LIDAR sensor scan data captured, for instance, in conjunction with the localization data 410 of FIG. 10. In this example, area 510 includes aspects of the parking spaces 310, 312, 314, vehicle 320, and posts 330-334.

In some instances, to ensure that the LIDAR sensor data is "useful" and not distorted or otherwise corrupted, the LIDAR sensor data that is saved may be that of the last complete scan of the LIDAR sensor when the LIDAR sensor is operating according to required performance specifications. The required performance specifications may correspond to the LIDAR sensor being in a steady state. The steady state may include the LIDAR sensor operating such as at a predetermined rotation speed, generating output with less than a particular maximum amount of noise, operating for at least a predetermined period of time (such as 5 seconds or more or less), etc., This may reduce the likelihood of errors if the actual last scan is not fully completed and/or the LIDAR sensor data is not properly processed before storing. Of course, so long as the vehicle is parked or stopped, any scan (and not simply the last complete scan), when the LIDAR sensor is operating according to the required performance specifications, may be saved.

The next time the computing devices 110 are unsuspended, for instance, in response to user input or other signal received at the ignition, a new LIDAR sensor scan may be captured. This information may be sent by the perception system 172 to the computing devices 110. To ensure consistency, this LIDAR sensor scan may be captured before the vehicle is moved and when the LIDAR sensor is operating according to the required performance specifications.

The new LIDAR sensor scan may be compared to the stored LIDAR sensor scan. As one approach, the comparison may be made using an iterative closest point (ICP) algorithm. The ICP algorithm may be used to determine correspondences between LIDAR sensor point clouds of the LIDAR sensor scans and may provide translation and rotation between those LIDAR sensor scans. If the ICP results indicate no rotation or translation or only to some small degree between points of a common object, this may be used to determine that the vehicle has not moved since it was turned off (and/or the computing devices suspended). In other words, some small tolerances, for instance on the order of a few centimeters, such as 10 or more or less) or degrees (such as 0.14 degrees or more or less) may be acceptable. When the vehicle is determined not to have moved since it was turned off (and/or the computing devices suspended), the stored localization data may then be loaded from the memory 130. For instance, the localization data may be stored in RAM of memory 130 and/or sent to the positioning system 170 for use. In this regard, the stored localization data may be used to localize the vehicle. This may include automatically setting the localization data as the vehicle's current localization data and using this to control the vehicle autonomously. In this regard, the positioning system 170 may report the position, orientation, and biases to other systems of the vehicle as needed to control the vehicle autonomously.

Figure 6:
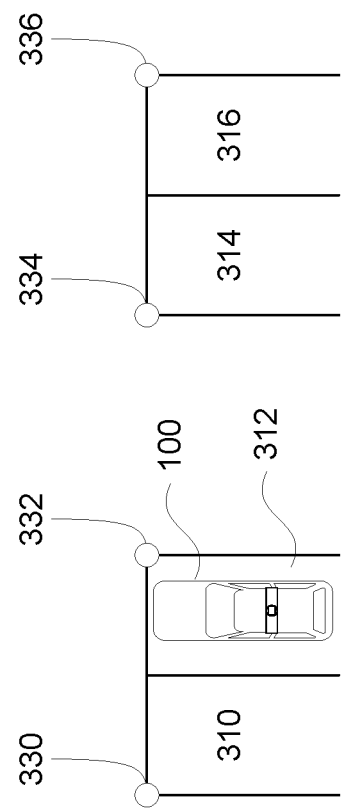
FIG. 6 is an example top-down view of a vehicle and features in the vehicle's environment in accordance with aspects of the disclosure.
Figure 7:
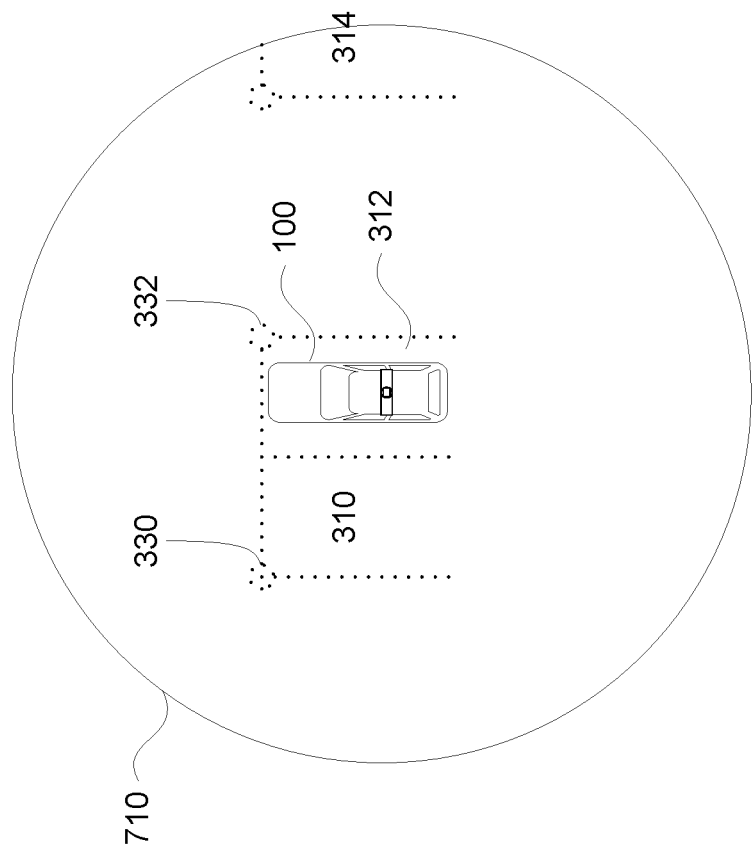
FIG. 7 is an example top-down view of a vehicle and example LIDAR sensor data in accordance with aspects of the disclosure.
Figure 8:
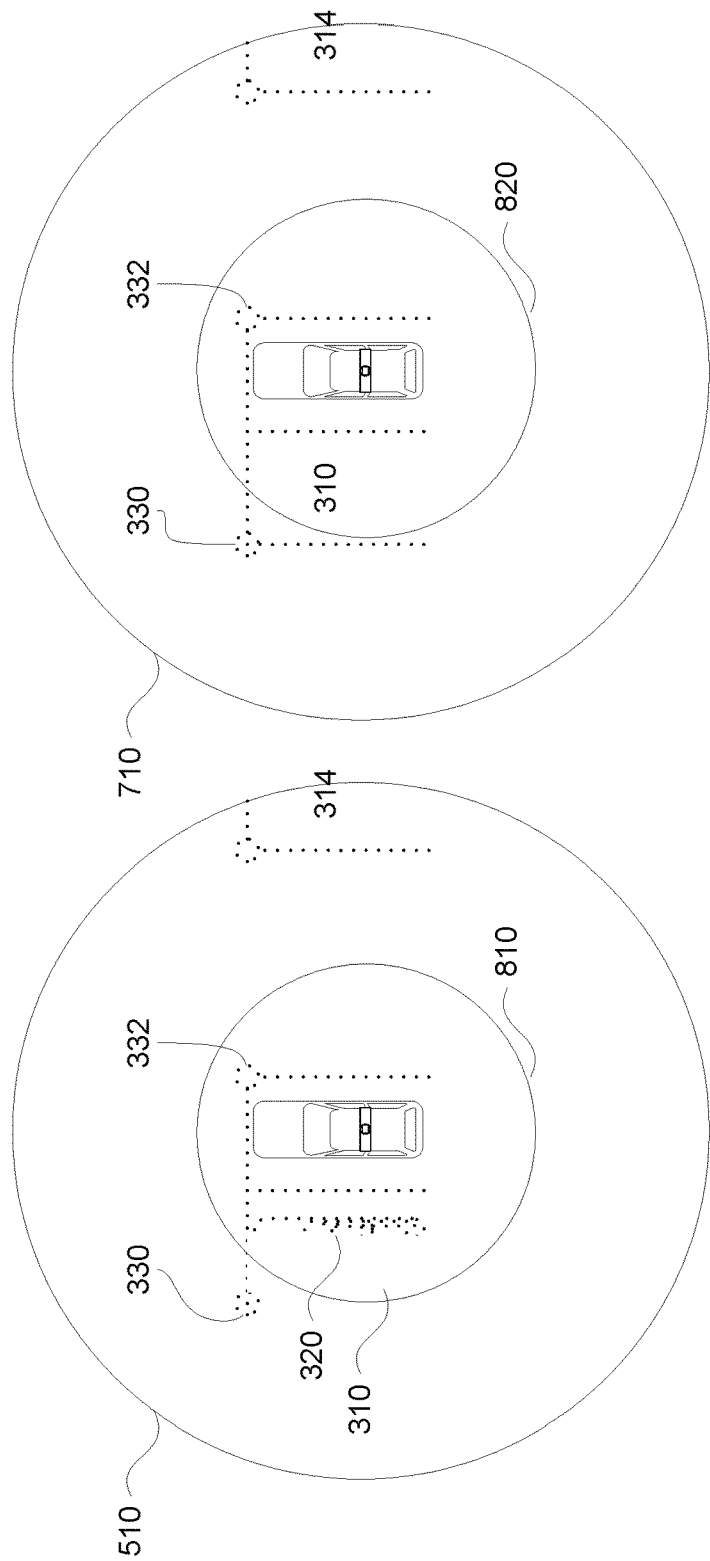
FIG. 8 is an example comparison of two top-down views of a vehicle and example LIDAR sensor data in accordance with aspects of the disclosure.

In order to avoid false positives or rather, false determinations that the vehicle has moved, some portion of each of the LIDAR sensor scans may be discarded before or while comparing. For instance, by filtering or removing all data points from the LIDAR sensor data beyond some threshold, such as 20 meters or more or less, from the vehicle's position when the LIDAR sensor scans were captured, this may reduce the influence of dynamic objects. As an example, turning to FIG. 6, vehicle 320 may have moved since the computing devices were suspended. In this sense, dynamic objects may be those that may have moved while the vehicle and/or the computing devices 110 were off. As a result, when a new scan is captured, there may be significant differences between the two LIDAR sensor scans. Turning to FIG. 7, area 710 represents a LIDAR sensor scan and LIDAR scan data captured, for instance, after vehicle 320 has moved. In this example, area 710 includes aspects of the parking spaces 310, 312, 314 and posts 330-334. Again, to avoid false positives, areas 510 and 710 may be filtered to remove objects too close to vehicle 100. For instance, turning to FIG. 8, LIDAR sensor points within areas 810, 820 corresponding to a predetermined radial distance from vehicle 100, may be filtered from areas 510, 710 and thereafter, the remaining LIDAR data points may be compared, for instance, using ICP as discussed above.

In addition, not all sensor points between the LIAR sensor scans (filtered or not) need to be perfectly aligned to confirm that the vehicle has not moved. For instance, only some portion of the data points, such as 40% or more or less, need to be within the aforementioned tolerance values in order to determine that the vehicle has not moved. This may further decrease the likelihood of false positives.

However, in some instances, the biases of the accelerometers and gyroscopes of the vehicle may be sensitive to temperature. For instance, if the air temperature is cooler when the vehicle's computing devices are suspended and warmer when the vehicle's computing devices are unsuspended, this may result in a change to the biases. As such, some manual driving may be required to reach a desired accuracy of the biases; however, storing and subsequently retrieving the stored localization data as described above can significantly reduce the amount of driving required, for instance by a factor of 10 or more or less. In addition, the vehicle's computing devices may measure temperature using a thermometer before the vehicle's computing devices are suspended, store this information in persistent memory as discussed in the examples above, measure temperature after the computing devices are unsuspended, and compare the temperature measurements. This comparison may be used as a signal to determine whether the temperature is likely to have affected the biases. If there is a significant difference in the temperature measurements, for instance greater than a few degrees or more or less, the biases may need to be corrected via manual driving. If there is not a significant difference, the biases may simply be read from the stored localization data.

Figure 9:
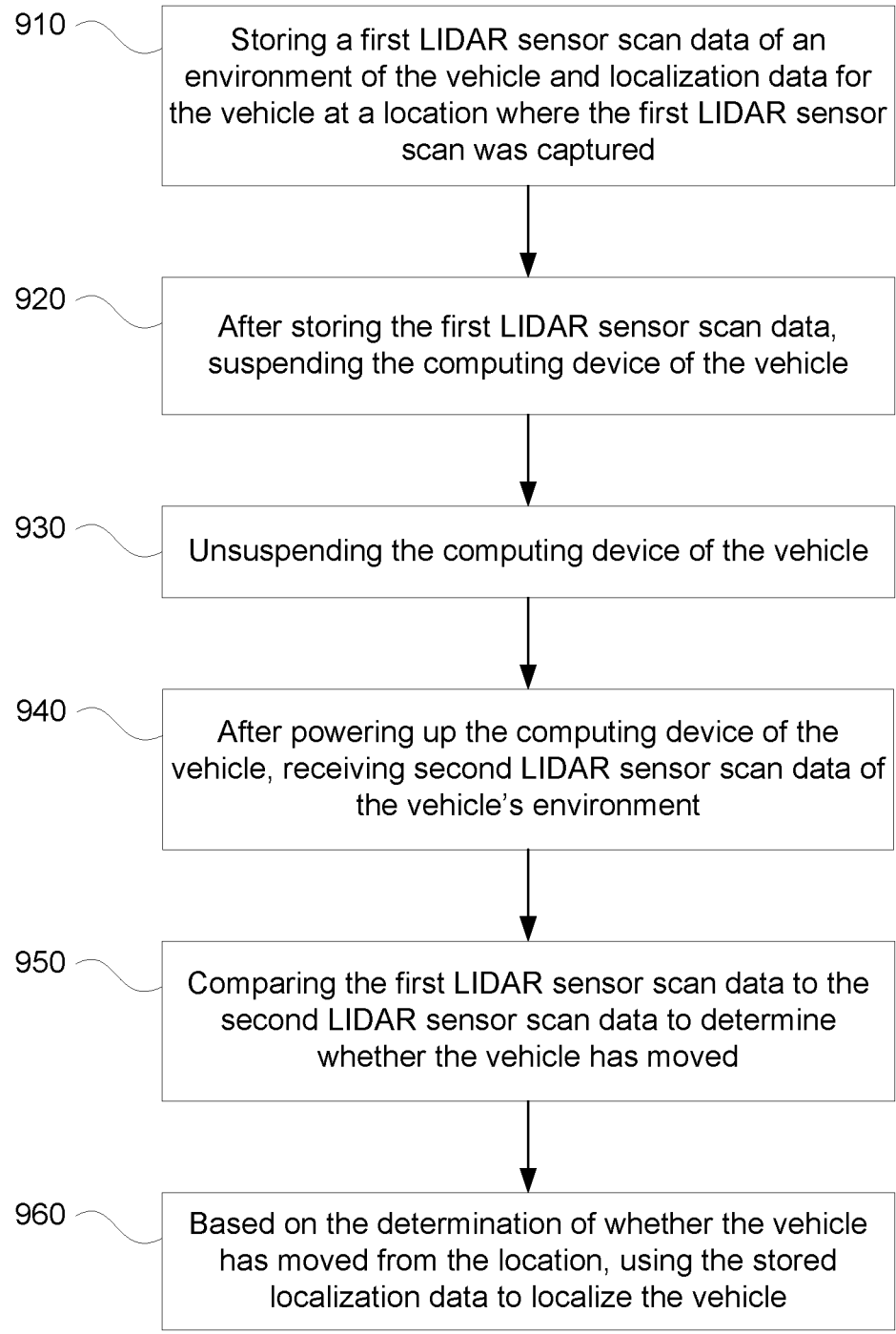
FIG. 9 is an example flow diagram in accordance with aspects of the disclosure.

FIG. 9 is an example flow diagram 900 of aspects of localizing a vehicle, which may be performed by aspects of a vehicle, such as computing devices 110 of vehicle 100. In this example, at block 910, a first LIDAR sensor scan data of an environment of the vehicle and localization data for the vehicle at a location where the first LIDAR sensor scan was captured is stored. At block 920, after storing the first LIDAR sensor scan data, the computing device of the vehicle is suspended, and at block 930, the computing device of the vehicle is unsuspended. At block 940, after the computing device of the vehicle is unsuspended, second LIDAR sensor scan data of the vehicle's environment is received. At block 950, the first LIDAR sensor scan data is compared to the second LIDAR sensor scan data to determine whether the vehicle has moved. At block 960, based on the determination of whether the vehicle has moved from the location, the stored localization data is used to localize the vehicle.

In some instances, the aforementioned approach may be less useful. For instance, in more dynamic environments, such as in a parking lot where other vehicles nearby are parked and un-parked fairly often, this may make using ICP to determine whether a vehicle has moved, even with tolerances and the aforementioned percentages, difficult. To address these situations, a completely different approach, useful both in situations in which the vehicle has been moved and dynamic environments, may be taken to localize the vehicle.

Figure 10:
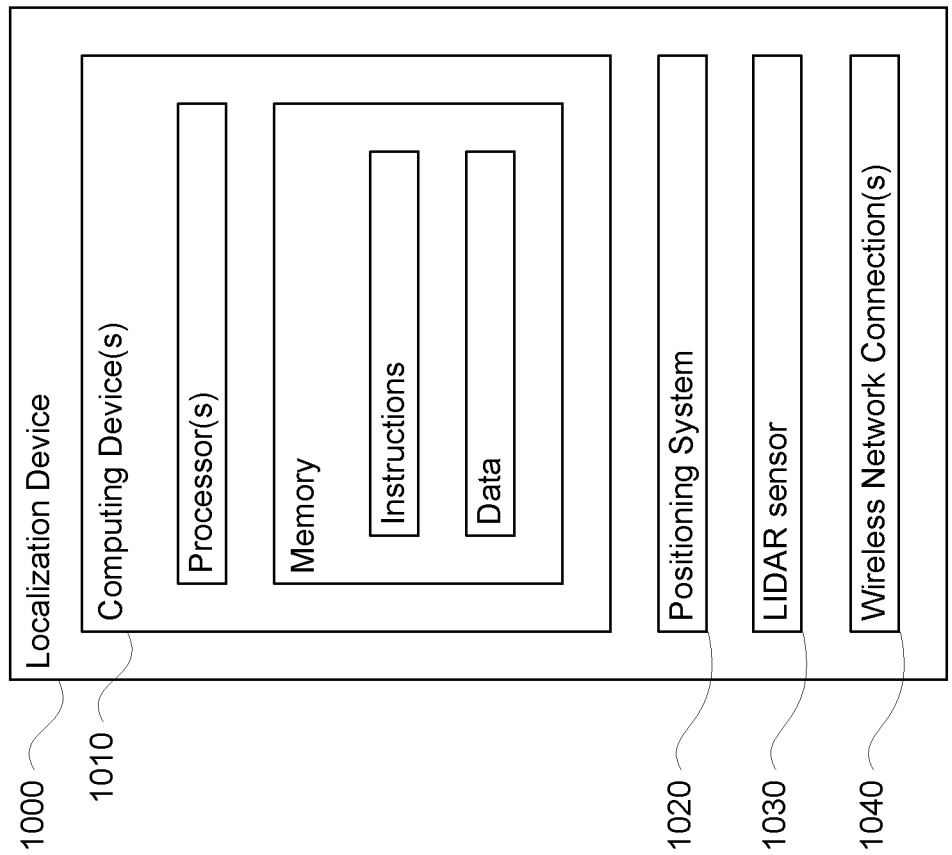
FIG. 10 is an example functional diagram of a localization device in accordance with aspects of the disclosure.

As an example, rather than relying on (or in addition to) store localization data, a remote localization device may help to facilitate localization of vehicle 100. For instance, this localization device may include a computing device, a LIDAR sensor, and a transmitter. For instance, FIG. 10 depicts a functional diagram of a localization device 1000 including a computing devices 1010, a positioning system 1020, a LIDAR sensor 1030, and one or more wireless network connections 1040. In this example, computing devices 1010 may be configured the same or similarly to computing devices 110 with one or more processors and memory storing data and instructions. In addition, the positioning system may be configured the same as or similarly to positioning system 170, including a GPS receiver, accelerometers, gyroscopes, etc. that allow the positioning system to determine the localization device's and/or LIDAR sensor 1030's position (e.g. latitude, longitude, elevation), pitch, yaw and roll. The LIDAR sensor 1030 may be configured to capture a LIDAR sensor scan and LIDAR sensor scan data of the localization device's environment, the same as or similar to the LIDAR sensor of dome housing 212. The wireless network connections 1040 may be configured the same or similarly to wireless network connections 156 and may allow the localization device 1000 to broadcast LIDAR sensor scan as well as localization information such as position (for instance, latitude, longitude, and elevation), pitch, yaw and roll for the localization device and/or the LIDAR sensor.

Figure 11:
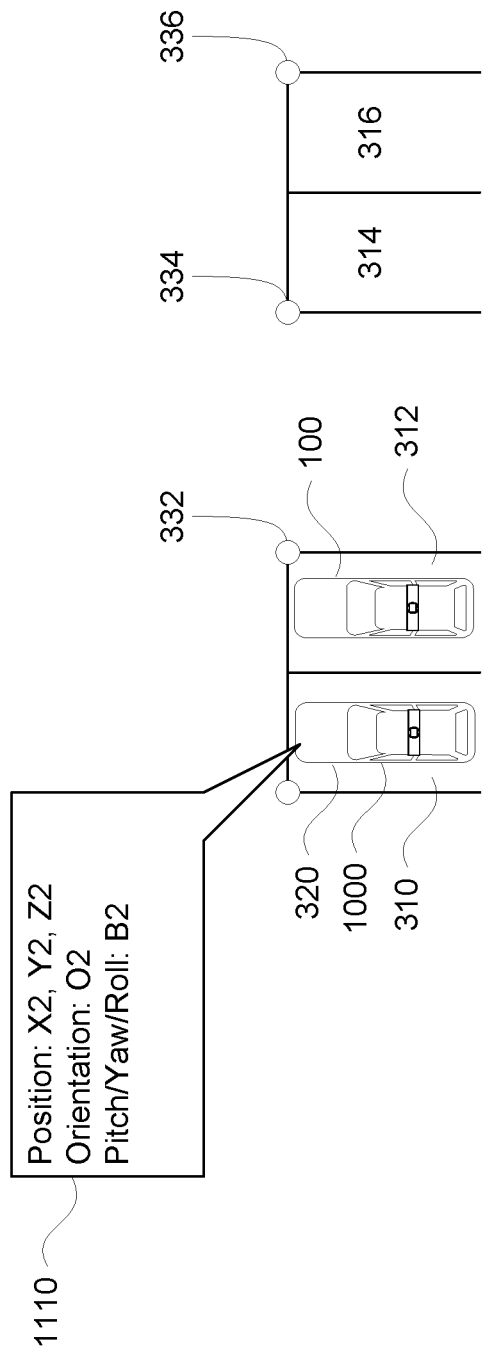
FIG. 11 is an example top-down view of a vehicle, features in the vehicle's environment, and data in accordance with aspects of the disclosure.
Figure 12:
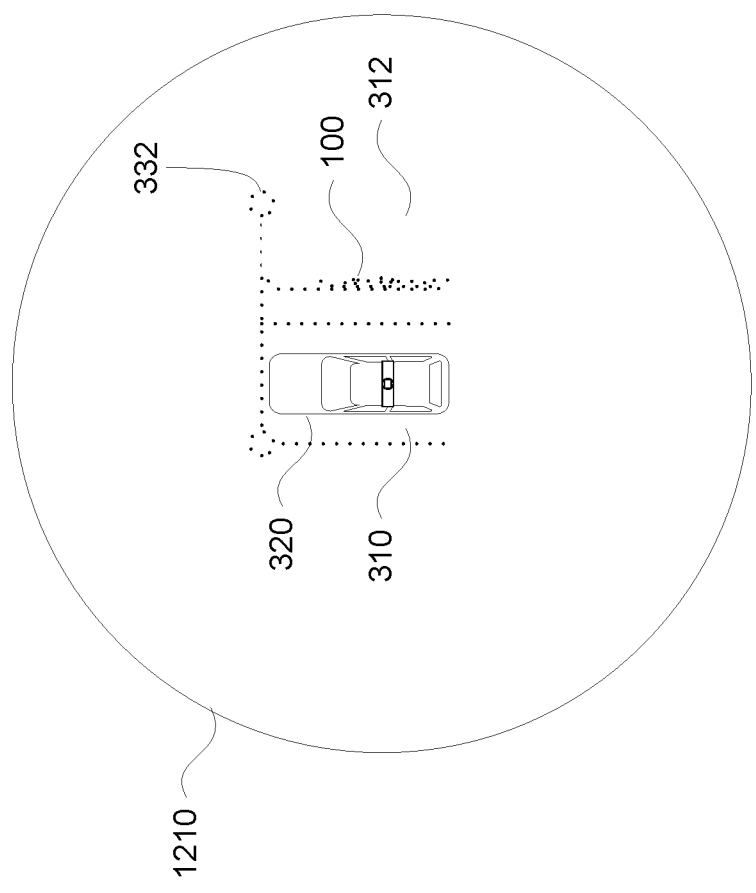
FIG. 12 is an example comparison of two top-down views of a vehicle and example LIDAR sensor data in accordance with aspects of the disclosure.

For instance, turning to FIG. 11, a localization device 1000, here shown incorporated into vehicle 320, is located proximate to vehicle 100. In this example, the computing devices 1010 may determine localization information 1110 including position (X2,Y2,Z3), orientation (O2), as well as pitch, yaw and roll (B2) for the localization device 1000 and/or LIDAR sensor 1030. In addition, the computing devices 1010 may receive LIDAR sensor scan data, For example, turning to FIG. 12, area 1210 represents a LIDAR sensor scan and LIDAR sensor scan data captured, for instance, in conjunction with the localization information 1110 of FIG. 11. The localization information 1110 and the LIDAR sensor scan data of area 1210 may be packaged into a broadcast message which may be sent out, for instance via radio or other wireless communication using the wireless network connections 1040, periodically such as several times a minute or more or less.

In situations in which the computing devices 110 are unsuspended and/or after determining that the vehicle has moved as described above, the computing devices 110 may receive and use one of these broadcasts for localizing the vehicle. Again, each broadcast may include localization information such as position, pitch, yaw and roll as well as LIDAR sensor scan data for the localization device. In addition, a new LIDAR sensor scan with new LIDAR sensor scan data may be captured by a LIDAR sensor of the vehicle 100, such as the LIDAR sensor of dome housing 212. Returning to the example of FIG. 5, the LIDAR sensor scan data of area 510 may have been captured when vehicle 100 was unsuspended and computing devices 110 were unsuspended such that the LIDAR sensor scan data of area 1210 and the LIDAR sensor scan data of area 510 may have been captured at or very near the same point in time. To ensure accuracy, this new LIDAR sensor scan may be captured when the LIDAR sensor of dome housing 212 is operating according to required performance specifications, such as a specified rotation speed, etc.

Figure 13:
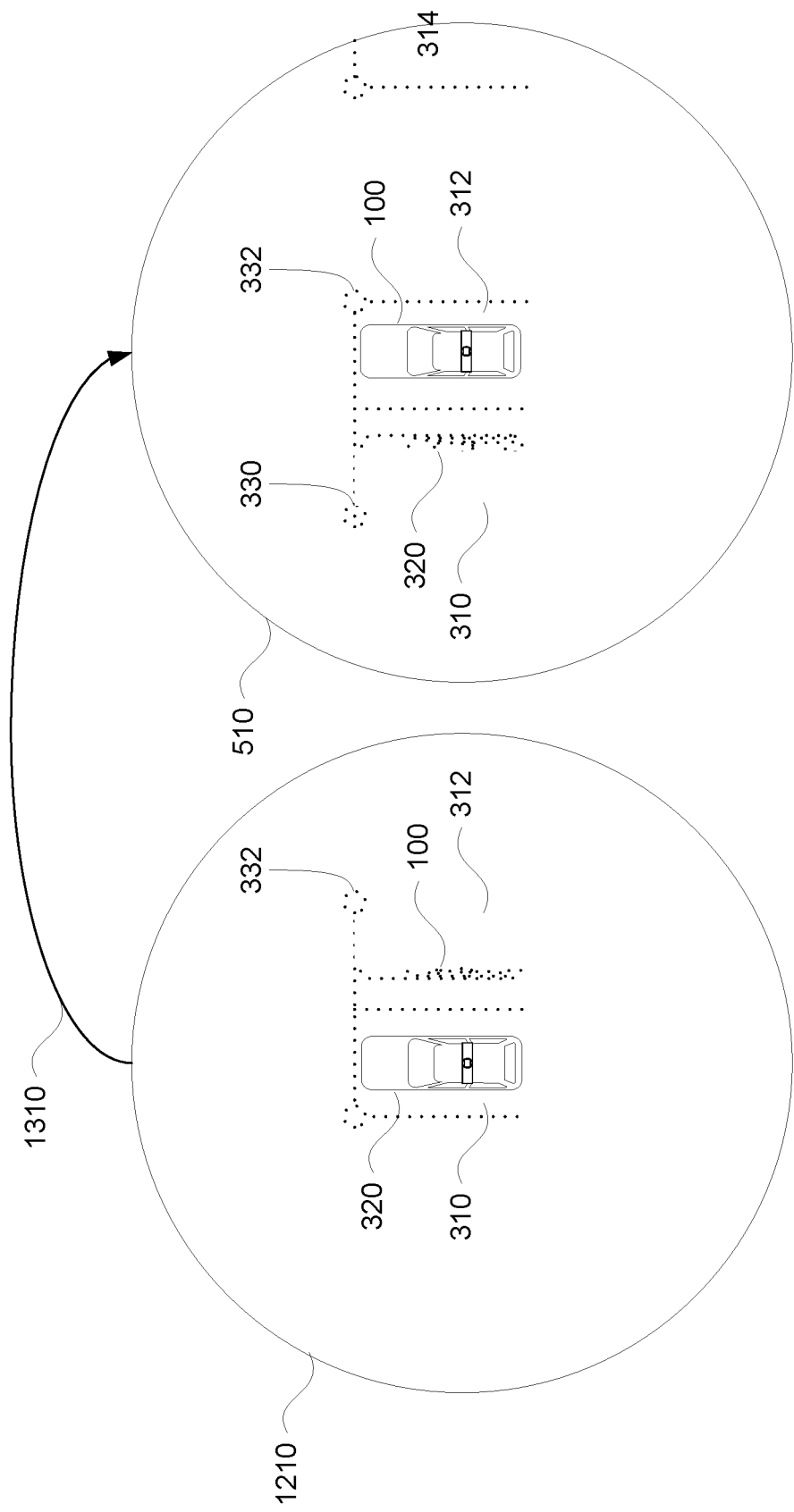
FIG. 13 is an example comparison of top-down views of different vehicles and example LIDAR sensor data in accordance with aspects of the disclosure.

The computing devices 110 may compare the LIDAR sensor scan data from the localization device 1000 to the new LIDAR sensor scan data to determine a transform. For example, the LIDAR sensor scan data of area 1210 may be compared to the LIDAR sensor scan data of area 510 as shown in FIG. 13. The comparison may include using ICP to determine a transform, represented by arrow 1310, between the LIDAR sensor scan data of area 1210 may be compared to the LIDAR sensor scan data of area 510. In some instances, this may also include the aforementioned filtering, for example to remove points within a predetermined radial distance of the vehicle 100 from the new LIDAR sensor scan data of area 510 and to remove points within the predetermined radian distance of the localization device 1000 from the LIDAR scan data of area 1210 (as can been seen, for instance, from the example of FIG. 8), before or while comparing.

In addition, this transform between the LIDAR sensor scan data would be the same transform for the vehicle's LIDAR sensor and the LIDAR sensor of the localization device.

The computing devices 110 may then apply the transform to the localization information 11110 from the localization device 1000 in order to determine new localization data for the vehicle. For instance, the transformed position (T·(X2, Y2,Z2)) and orientation (T·O2) of the localization device 1000 may be used to determine a current position and orientation of the vehicle. The transformed pitch, yaw and roll (T·B2) may be used to determine the biases of the vehicle's accelerometers and gyroscopes.

This transformed information may be used to localize the vehicle. This may include automatically setting the current position, current orientation, and the determined biases as the vehicle's current localization data and using this to control the vehicle autonomously. In this regard, the positioning system 170 may report the position, orientation, and biases to other systems of the vehicle as needed to control the vehicle autonomously.

At this point, the vehicle 100 may become a new localization device, providing localization information to the computing devices of other nearby vehicles. In this regard, the localization device may be any number of different types of devices. For instance, the localization device may include a computing device of another autonomous vehicle, a stationary localization devices, and/or a drone. For instance, the drone may be configured to drive or fly in specific patterns around a parking area in order to facilitate localization of vehicles. In addition, the computing devices 1010 of the localization device 1000 may be configured to automatically broadcast the aforementioned LIDAR sensor scan and localization information, or send this information only when prompted or specifically requested to do so by the computing devices 110.

Figure 14:
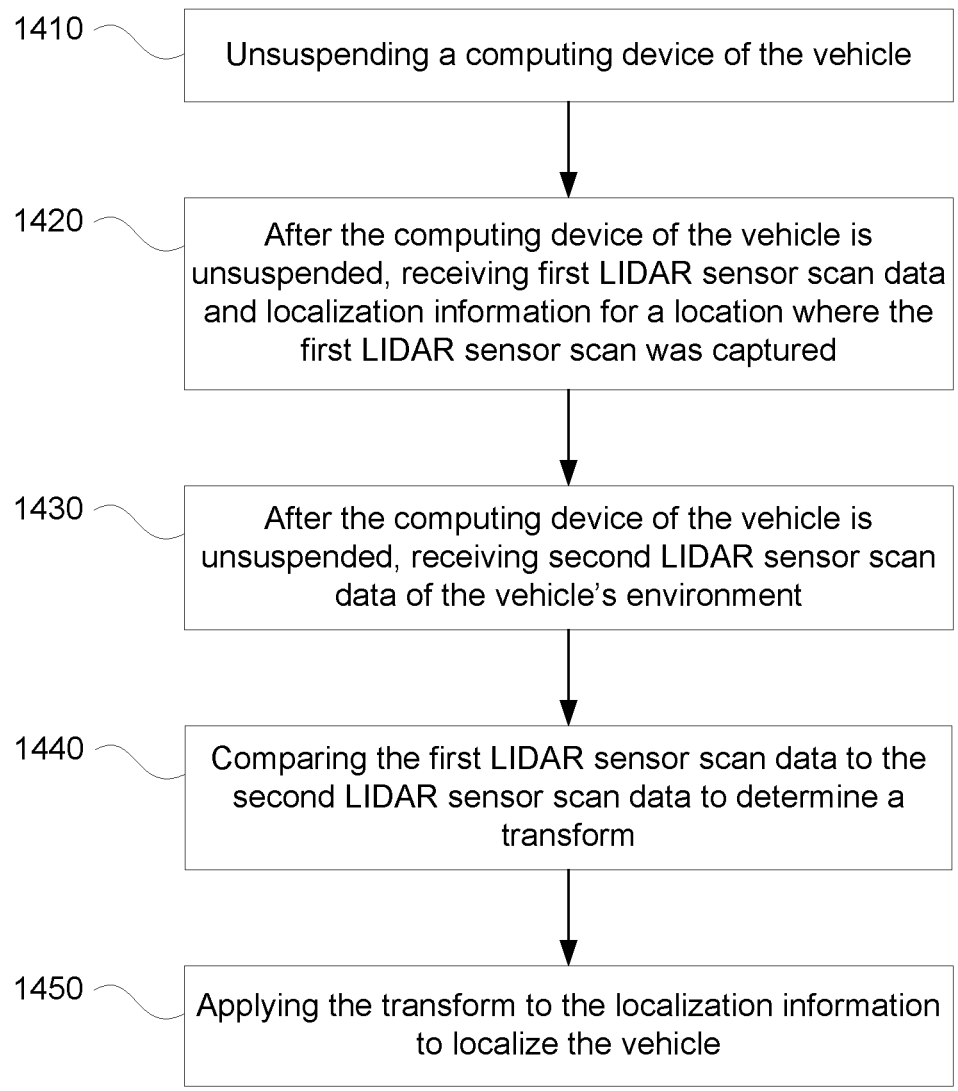
FIG. 14 is an example flow diagram in accordance with aspects of the disclosure.

FIG. 14 is an example flow diagram 1400 of aspects of localizing a vehicle, which may be performed by aspects of a vehicle, such as computing devices 110 of vehicle 100. In this example, at block 1410, a computing device of the vehicle is unsuspended. At block 1420, after the computing device of the vehicle is unsuspended, first LIDAR sensor scan data and localization data for a location where the first LIDAR sensor scan was captured is received. At block 1430, after the computing device of the vehicle is unsuspended, second LIDAR sensor scan data of the vehicle's environment is received. At block 1440, the first LIDAR sensor scan data to the second LIDAR sensor scan data are compared in order to determine a transform. At block 1450, the transform is applied to the localization data in order to localize the vehicle.

The features described herein provide efficient and accurate ways to localize a vehicle after its computing devices have been suspended. This can be incredibly useful to reducing costs and other resources (such as human operator time and labor to drive the vehicle in a manual driving mode) when operating a fleet of autonomous vehicles. In other words, these approaches may reduce the time spent localizing vehicles, thereby increasing the time that such vehicles are available for use, for instance, to provide transportation services.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of localizing a vehicle, the method comprising:
   storing in a memory of the vehicle, by a computing device of the vehicle, localization data including biases for a positioning system of the vehicle that are sensitive to temperature;
   receiving, by the computing device, user input at an ignition of the vehicle to deactivate the ignition of the vehicle that is currently activated;
   in response to the user input, storing in the memory, by the computing device, a first temperature of an environment of the vehicle measured by the computing device;
   after the ignition of the vehicle is deactivated and then is again activated, measuring, by the computing device, a second temperature of the environment of the vehicle;
   comparing, by the computing device, the stored first temperature measurement to the second temperature measurement to obtain a first result; and
   upon manual driving of the vehicle in response to the first result to correct the biases, localizing, by the computing device, the vehicle based, at least in part, on the corrected biases.

2. The method of claim 1, further comprising:
   sending a first wireless signal to deactivate the ignition of the vehicle; and
   sending a second wireless signal to activate the ignition of the vehicle.

3. The method of claim 1, further comprising:
   storing, by the computing device, first LIDAR sensor scan data of the environment of the vehicle and localization data for the vehicle at a location where the first LIDAR sensor scan data was captured;
   receiving, by the computing device, second LIDAR sensor scan data of the vehicle's environment;
   comparing, by the computing device, the first LIDAR sensor scan data to the second LIDAR sensor scan data to obtain a second result; and
   using, by the computing device, the localization data to localize the vehicle based on the first result and the second result.

4. The method of claim 3, further comprising using a LIDAR sensor to capture the first LIDAR sensor scan data and to capture the second LIDAR sensor scan data.

5. The method of claim 4, further comprising, prior to obtaining the first result:
   filtering the first LIDAR sensor scan data to remove data points beyond a threshold distance from the LIDAR sensor when the first LIDAR sensor scan data was captured; and
   filtering the second LIDAR sensor scan data to remove data points beyond a threshold distance from the LIDAR sensor when the second LIDAR sensor scan data was captured, and wherein comparing includes comparing the filtered first LIDAR sensor scan data with the filtered second LIDAR sensor scan data.

6. The method of claim 4, further comprising, determining a percentage of pairs of points between the first LIDAR sensor scan data and the second LIDAR sensor scan data having rotations and translations within tolerance values, and wherein using the localization data is further based on the percentage of pairs of points.

7. The method of claim 1, wherein the localization data further includes a location of the vehicle and an orientation of the vehicle.

8. The method of claim 1, wherein the biases are for one or more of an accelerometer or a gyroscope included in the positioning system.

9. The method of claim 1, wherein the computing device is further configured to control the vehicle in an autonomous driving mode.

10. A localization device for localizing a vehicle, the localization device comprising:
    a computing device, comprising:
       a memory; and
       one or more processors configured to:
          store localization data in the memory, the localization data including biases for a positioning system of the vehicle that are sensitive to temperature;
          receive user input at an ignition of the vehicle to deactivate the ignition of the vehicle that is currently activated;
          in response to the user input, store in the memory a first temperature of an environment of the vehicle measured by the one or more processors; and
          after the ignition of the vehicle is deactivated and then is again activated, measure a second temperature of the environment of the vehicle;
          compare the stored first temperature measurement to the second temperature measurement to obtain a first result; and
          upon manual driving of the vehicle in response to the first result to correct the biases, localize the vehicle based, at least in part, on the corrected biases.

11. The localization device of claim 10, wherein the one or more processors are further configured to:

send a first wireless signal to deactivate the ignition of the vehicle; and send a second wireless signal to activate the ignition of the vehicle.

12. The localization device of claim 10, further comprising:

a first LIDAR sensor; and a second LIDAR sensor, wherein the one or more processors are further configured to:

store, in the memory, first LIDAR sensor scan data of the environment of the vehicle and localization data for the vehicle at a location where the first LIDAR sensor scan data was captured;

receive second LIDAR sensor scan data of the vehicle's environment;

compare the first LIDAR sensor scan data to the second LIDAR sensor scan data to obtain a second result; and use the localization data to localize the vehicle based on the first result and the second result.

13. The localization device of claim 12, wherein the one or more processors are further configured to, prior to obtaining the first result:

filter the first LIDAR sensor scan data to remove data points beyond a threshold distance from the first LIDAR sensor when the first LIDAR sensor scan data was captured; and filter the second LIDAR sensor scan data to remove data points beyond a threshold distance from the first LIDAR sensor when the second LIDAR sensor scan data was captured, wherein the filtered first LIDAR sensor scan data is compared with the filtered second LIDAR sensor scan data.

14. The localization device of claim 12, wherein the one or more processors are further configured to determine a percentage of pairs of points between the first LIDAR sensor scan data and the second LIDAR sensor scan data having rotations and translations within tolerance values, and wherein the localization data is used based on the percentage of pairs of points.

15. The localization device of claim 10, wherein the localization data further includes a location of the vehicle and an orientation of the vehicle.

16. The localization device of claim 10, wherein the biases are for one or more of an accelerometer or a gyroscope included in the positioning system.

17. The method of claim 1, further comprising:

when the first result indicates that the correction is not needed, localizing, by the computing device, the vehicle using the biases stored in the memory.

18. The localization device of claim 10, wherein when the first result indicates that the correction is not needed, the one or more processors are further configured to localize the vehicle using the biases stored in the memory.

* * * * *